United States Patent
Blaszczyk et al.

(10) Patent No.: US 6,946,282 B2
(45) Date of Patent: Sep. 20, 2005

(54) PROCESS FOR DECREASING THE REDUCING SUGARS CONTENT OF LIGHT STEEPWATER

(75) Inventors: Roman J. Blaszczyk, London (CA); Lawrence A. Trickey, London (CA)

(73) Assignee: Corn Products International, Inc., Westchester, IL (US)

( * ) Notice: Subject to any disclaimer, the term of this patent is extended or adjusted under 35 U.S.C. 154(b) by 327 days.

(21) Appl. No.: 10/259,035

(22) Filed: Sep. 27, 2002

(65) Prior Publication Data

US 2004/0063192 A1 Apr. 1, 2004

(51) Int. Cl.⁷ ............ C12N 1/24; C12P 19/14; C12P 7/56; C08B 30/00
(52) U.S. Cl. ............ 435/251; 435/99; 435/139; 127/68
(58) Field of Search ............ 435/43, 251, 99, 435/139, 41, 262, 467; 127/68

(56) References Cited

U.S. PATENT DOCUMENTS

| | | | |
|---|---|---|---|
| 2,218,221 A | 10/1940 | Schopmeyer et al. | |
| 2,322,413 A | 6/1943 | Bishop et al. | |
| 2,444,176 A | 6/1948 | Thomas et al. | |
| 2,515,157 A | 7/1950 | Parsons | |
| 4,086,135 A | 4/1978 | Balana et al. | |
| 4,359,528 A | 11/1982 | Devos et al. | |
| 4,980,282 A | * 12/1990 | de Troostembergh et al. | 435/43 |
| 5,067,982 A | 11/1991 | Caransa et al. | |
| 5,902,615 A | 5/1999 | Saniez et al. | |
| 6,179,926 B1 | 1/2001 | Kiser et al. | |

FOREIGN PATENT DOCUMENTS

| | | |
|---|---|---|
| EP | 0 026 125 A1 | 4/1981 |
| EP | 0 272 049 A2 | 6/1988 |
| EP | 1 044 988 A1 | 10/2000 |
| FR | 2 254 641 | 11/1975 |
| JP | 2000312599 | 11/2000 |

OTHER PUBLICATIONS

European Patent Office Search Report, Feb. 6, 2004.

* cited by examiner

*Primary Examiner*—Robert A. Wax
*Assistant Examiner*—Rosanne Kosson
(74) *Attorney, Agent, or Firm*—Norris, McLaughlin & Marcus

(57) ABSTRACT

A process for decreasing the reducing sugars content of light steepwater comprising complementary incubation of light steepwater from a corn steeping process having sulfur dioxide ($SO_2$) content at between about 20 ppm and about 220 ppm for at least about 5 hours. The process is particularly useful for obtaining Pharmaceutical Industry Grade Steepwater.

28 Claims, 1 Drawing Sheet

PROCESS FOR DECREASING THE REDUCING SUGARS CONTENT OF LIGHT STEEPWATER

BACKGROUND OF THE INVENTION

1. Field of the Invention

The invention pertains to a process for decreasing the content of reducing sugars in light steepwater ("LSW"), such as a process for making Pharmaceutical Industry Grade Steepwater. The process comprises incubation of LSW having a sulfur dioxide ($SO_2$) content at between about 20 ppm and about 170 ppm for at least about 5 hours at a temperature between about 33° C. and about 48° C. to decrease the reducing sugars content.

2. The Related Art

At the beginning of the process of wet-milling corn, whole corn is steeped in water containing $SO_2$ at an elevated temperature and acid pH for an extended period of time. During the course of the steep, soluble substances are extracted from the corn grain into the steep water where some ferment due to microorganisms present on the corn kernel. The resulting steepwater can be used as a fermentation medium component to produce a wide variety of products in the fermentation industry. Due to the many variations in the steeping process, the characteristics of corn steepwater found in the market varies widely.

Pharmaceutical Industry Grade Steepwater is generally characterized by low content of reducing sugars (usually about 2% or less, however, the reducing sugars content may be up to about 4% or even up to about 6% for certain applications in the pharmaceutical industry), high level of lactic acid and low level of free amino acids. Traditional steeping processes are ineffective or unable to produce LSW having the characteristics required for Pharmaceutical Industry Grade Steepwater. Typically, traditional or conventional industrial steeping processes result in LSW having reducing sugars content in the range about 10% to about 16%, which is generally too high for applications in the pharmaceutical industry.

U.S. Pat. No. 4,359,528 describes a steeping procedure that combines use of temperature gradient and low draw, which results in a steepwater product suitable for pharmaceutical applications. U.S. Pat. No. 6,179,926 describes incubating LSW in a base buffer resulting in a low content of reducing sugars.

The invention concerns a process in which the amount of $SO_2$ content in the LSW is established to allow the lactic acid bacteria to convert reducing sugars into lactic acid while inhibiting yeast in the LSW from producing ethyl alcohol and carbon dioxide. This process can decrease the reducing sugars content of LSW to less than about 6%, preferably less than about 4%, most preferably less than about 2%, including eliminating or substantially eliminating reducing sugars from the LSW. The process can be used to obtain Pharmaceutical Industry Grade Steepwater.

In the present specification, all parts and percentages are by weight/weight unless otherwise specified.

SUMMARY OF THE INVENTION

The process comprises complementary treatment of LSW to decrease the reducing sugars content. In the process, LSW is drawn off from a conventional steeping process, generally a process comprising one or more steeping tanks, in which corn is subjected to acid water and circulated within the steeping battery. The $SO_2$ content of the drawn off LSW is established at between about 20 ppm and 220 ppm and the drawn off LSW is incubated in a vessel for at least about 5 hours, for example between about 5 hours and about 60 hours at a temperature of between about 33° C. and about 48° C. Achieving less than about 2% reducing sugars content, including eliminating or substantially eliminating reducing sugars content, can be obtained by incubating the drawn off LSW for between about 6 and about 48 hours, at a temperature between about 37° C. and about 45° C.

The $SO_2$ content in the drawn off LSW is established by adequate $SO_2$ distribution in the steeping battery, addition of hydrogen peroxide to the drawn off LSW or combinations thereof. The process results in a LSW having low reducing sugars content, such as less than about 6%, preferably less than about 4%, and most preferably less than about 2% reducing sugars. In preferred embodiments of the invention, the LSW will have substantially no reducing sugars content after the incubation period. The invention is particularly useful in obtaining Pharmaceutical Industry Grade Steepwater from LSW drawn from conventional corn steeping processes, such as acid treatment of corn in a battery of steeping tanks.

DETAILED DESCRIPTION OF THE INVENTION

Figure 1:
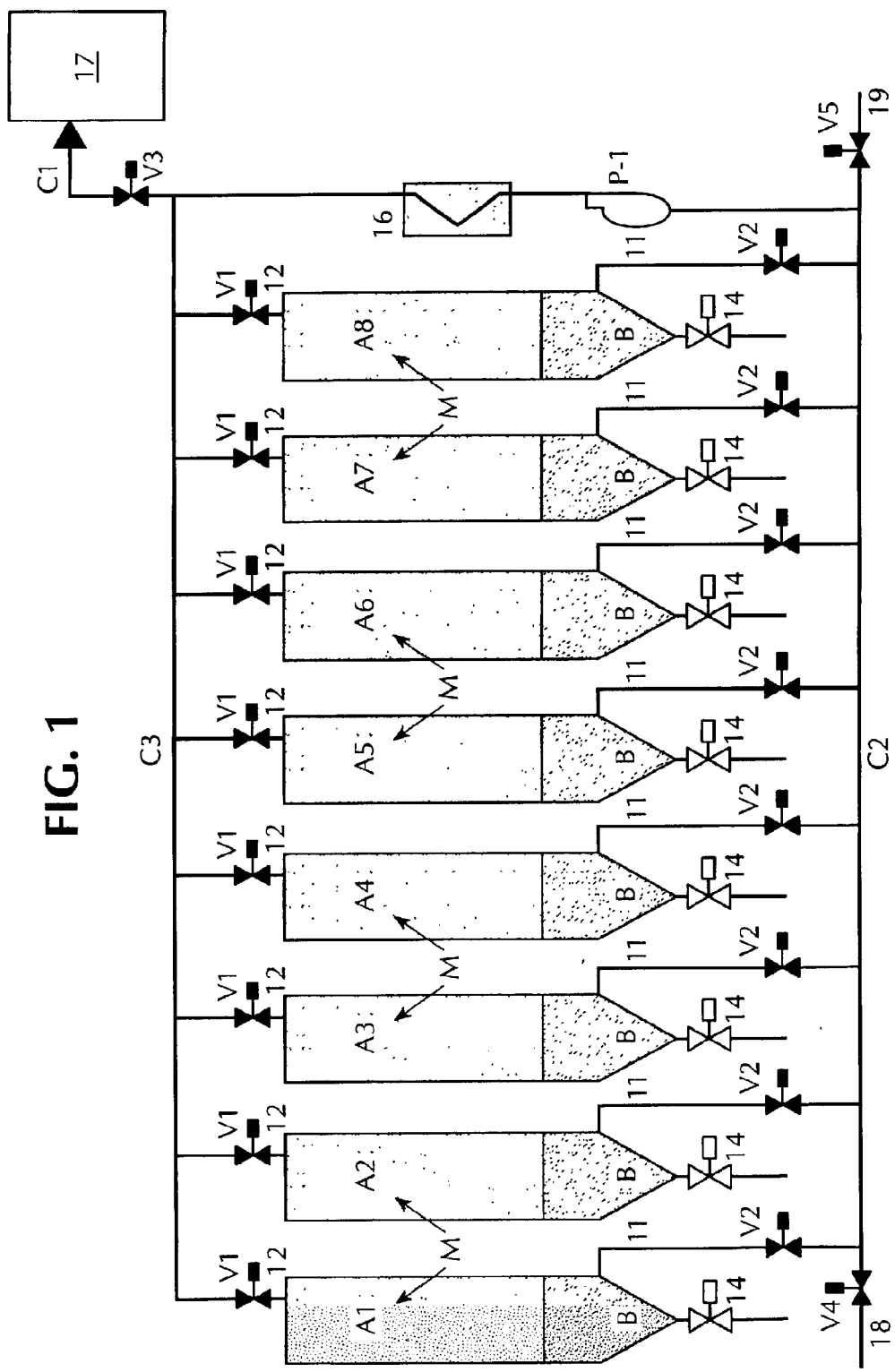
FIG. 1 is a diagrammatic side elevation of a battery of tanks used in a corn steeping process.

The invention pertains to a process for decreasing the content of reducing sugars in LSW drawn off from a corn steeping process. The process can be used to obtain Pharmaceutical Industry Grade Steepwater, i.e. steepwater having a low reducing sugars content, such as less than about 6%, preferably less than about 4% and most preferably less than about 2%. The process involves the complementary treatment, i.e. incubation, of LSW drawn from a corn steeping process.

The process comprises the steps of incubating LSW drawn from a corn steeping process (referred to herein as "drawn off LSW") having an $SO_2$ content of from about 20 ppm to about 220 ppm, preferably between about 50 ppm and about 210 ppm, most preferably from about 70 ppm to about 140 ppm and incubating the drawn off LSW for at least about 5 hours, preferably between about 5 hours and about 60 hours, at a temperature from about 33° C. to about 48° C. A particularly preferred process of the invention comprises providing drawn off LSW having a $SO_2$ content of between about 20 ppm to about 170 ppm, most preferably between about 60 ppm and 80 ppm, for about 6 hours to about 30 hours at a temperature between about 38° C. and 42° C.

FIG. 1 illustrates an example of an industrial steeping battery having 8 steep tanks. It will be appreciated by one skilled in the art that, although the typical steeping process is illustrated herein with eight steep tanks, corn steeping may be conducted with any number of steeping tanks, such as corn steeping process comprising a steeping battery having one or more steeping tanks, and the invention encompasses complementary incubation of LSW drawn off from any steeping process or battery configuration provided that the conditions are such that the drawn off LSW comprises between about 20 ppm and about 220 ppm $SO_2$.

Referring now to FIG. 1, the steeping battery comprises eight tanks (A1 to A8) of stainless steel each having a filtering base B. The steeping battery illustrated in FIG. 1 further comprises piping 11 connecting the base of a given tank to the head of the tank itself, and to the heads of the other seven tanks via a common drain pipe C2 and a common fill pipe C3 ensuring the recycling of the water into the tank itself or to any other tank, this piping also serving to withdraw the steep water at a given time through common pipelines shown in FIG. 1, bottom valves 14 for emptying the corn, tube and shell heat exchanger 16 with a circulating pump P-1 which controls the liquid flow through the heating tubes in heat exchanger 16 to the head of any other tank, eight water drain valves V2 placed on pipeline 11 to segregate each tank from the common drain line C2 allowing water movement throughout the battery, eight water fill valves V1 placed on pipeline 12 to segregate each tank from the common fill line C3 allowing water movement throughout the battery, an outlet pipe C1 and valve V3 connecting to an incubation tank or vessel 17. The tanks are filled with corn M and process water is moved countercurrently through the steep tanks with the oldest corn contacting fresh water and the oldest water contacting the fresh corn in the battery.

In the system, the corn does not move from steep tank to steep tank; only the water is advanced between tanks and the corn is replaced periodically from corn storage silos (not shown). If the acid water in the tank with fresh corn is maintained at an $SO_2$ content in the range of about 60 ppm to about 100 ppm, then the temperature in this tank can be temporarily decreased to about 39° C. to about 42° C. which causes conditions for pre-incubation in this steep tank, e.g. begins the reduction of reducing sugars towards desired levels before the LSW is drawn off, which then reduces the amount of incubation time needed in the complementary process described herein to obtain LSW with reducing sugars content less than about 6%, preferably less than about 4% and most preferably less than about 2%.

The process may comprise the further step of a method for establishing the $SO_2$ content of the drawn off LSW. This method can be selected from the group consisting of adequate $SO_2$ distribution in the steeping battery from which the drawn off LSW is obtained, the addition of hydrogen peroxide to the LSW or combinations thereof.

The $SO_2$ content in the drawn off LSW is preferably established by adequate $SO_2$ distribution in the steeping battery. We have found that $SO_2$ content in the fresh acid water varying from about 1,200 ppm to about 2,500 ppm, subject to type of corn and steeping rate, will obtain drawn off LSW having between about 20 ppm and about 220 ppm $SO_2$.

The $SO_2$ content of the drawn off LSW may also be adjusted in full or in part, by the addition of hydrogen peroxide under agitation directly into the vessel where the complementary incubation occurs or into the LSW after removal from the steeping battery but prior to the LSW entering the vessel where the incubation occurs. $SO_2$ adjustment is necessary when the drawn off LSW direct from the corn steeping process has an $SO_2$ content higher than 220 ppm to reduce the content of $SO_2$ to about 220 ppm or less for the incubation. The amount of hydrogen peroxide required to reduce the $SO_2$ content is a function of the amount of $SO_2$ in the drawn off LSW and other components of the steep water. Generally, however, about 1 ppm of hydrogen peroxide is needed per about one ppm of $SO_2$ removed. In the most preferred embodiment of the invention, the required $SO_2$ content in the LSW is established by adequate $SO_2$ distribution in the steeping battery and hydrogen peroxide is added to the drawn off LSW for minor adjustment of the $SO_2$ content in the LSW, if necessary.

The incubation of the drawn off LSW may be conducted in any appropriate vessel or reactor that will not contaminate the LSW, such as a stainless steel or fiberglass vessel or reactor. The vessel or reactor preferably is equipped with a heat jacket or other heat transfer system so that the appropriate temperature can be controlled and maintained. The vessel or reactor may also be equipped with a means for stirring or agitating the drawn off LSW during incubation, such as an impeller, stirrer, or circulation pump.

During incubation, the LSW can be, but need not be, agitated, either continuously at a very low speed during the incubation period or intermittently at intervals of about 3 to about 5 minutes every hour. Agitation is generally preferred when the $SO_2$ content in the LSW is below about 120 ppm, and a preferred process of the invention involves LSW having initial $SO_2$ content of between about 60 ppm and 100 ppm incubated from about 16 hours to about 30 hours with intermittent mixing of about 1 minute to about 5 minutes about every hour with an incubation temperature of about 33° C. to about 48° C. No agitation or mixing will also promote low reducing sugar steepwater. Embodiments of the invention not involving mixing are preferably when the $SO_2$ content is higher, such as between about 120 ppm and 180 ppm requiring a longer incubation time, such as between about 40 hours and about 64 hours.

Preferably, after the incubation period, the drawn off LSW is converted to Pharmaceutical Industry Grade Steepwater, in that the reducing sugars content has been decreased to less than about 6%, preferably less then about 4% and most preferably less then about 2%. After the incubation period, the incubated LSW may have no or substantially no reducing sugars content. The decrease in the reducing sugars content is a function of incubation time and, as such, although the process may preferably be used to obtain Pharmaceutical Industry Grade Steepwater, the process can be used for decreasing the reducing sugars content of drawn off LSW by any amount even if the end product would not be useful for pharmaceutical applications. After the incubation period, the drawn off LSW can be used as a liquid product, either directly or after partial evaporation, or may be dried and used as a dry product.

In the invention, the lactic bacteria growth is not suppressed by residual $SO_2$ in the LSW, but is suppressed by concentration of lactic acid. Generally, about 30% concentration of lactic acid in the LSW will fully suppress bacterial growth. The lactic bacteria is preferably from native microorganisms on the corn kernels, however, if needed, commercially available lactic bacteria can be added, such as *Lactobacillus* LH-32. The $SO_2$ content in the drawn off LSW provides an environment for the lactic acid bacteria to fully convert reducing sugars into lactic acid but does not permit yeast to produce ethyl alcohol and carbon dioxide. If the $SO_2$ content in the LSW is relatively high, such as 210 ppm or higher than about 220 ppm, the reducing sugars content drops very slowly and practically never reaches Pharmaceutical Industry Grade Standards, and if the $SO_2$ content in the LSW is lower than about 20 ppm, ethyl alcohol and carbon dioxide are produced in parallel with lactic acid.

EXAMPLES

Example 1

Thirty-five thousand gallons of LSW having an initial $SO_2$ content of about 140 ppm were drawn from a standard corn steeping process into a vessel having temperature control and means for agitation. Fifty-three liters of a 20% solution of $H_2O_2$ were added to the vessel under continuous light agitation, and the $SO_2$ content decreased to about 74 ppm. The LSW had an initial reducing sugars content of about 11.6%. The LSW was incubated in the vessel for about 48 hours at a constant temperature of about 39° C., and agitated for one half hour every 3 to 5 hours during the incubation. At the end of the incubation period, the reducing sugars content was about 3.5%.

Example 2

Thirty-five thousand gallons of LSW having an initial $SO_2$ content of about 50 ppm were drawn from a standard corn steeping process into a vessel having temperature control and means for agitation. The LSW had an initial reducing sugars content of about 12%. The LSW was incubated for about 24 hours at a constant temperature of about 40° C., and agitated every second hour for 15 minutes. At the end of the incubation period, the reducing sugars content was about 1.4%.

Example 3

Thirty-five thousand gallons of LSW having an initial $SO_2$ content of about 140 ppm were drawn from a standard corn steeping process into a vessel having temperature control and means for agitation. One hundred liters of a 35% solution of $H_2O_2$ were added to the vessel under light agitation, and the $SO_2$ content decreased to about 50 ppm. The LSW was incubated for about 40 hours at a temperature of about 44° C. with agitation for one half hour every 3 to 5 hours, however, this incubation decreased the reducing sugars content only to 8%. At that time in the trial, the incubation temperature was decreased to about 38° C. while maintaining the agitation at 3 to 5 hour time intervals, and the reducing sugars content dropped to 3% after an additional 24 hour incubation period.

Example 4

One gallon of LSW having an initial $SO_2$ content of 18 ppm was incubated in a sealed container at 40° C. without any mixing. Initial pH was 4.15, initial dry solids content was 14.8% and initial reducing sugars content was 11.4%. After 20 hours of incubation, the $SO_2$ and dry solids content remained substantially the same while pH dropped to 3.94 and reducing sugars dropped to 8.4%. A slight smell of alcohol fermentation was detected. After next 24 hours of incubation, pH dropped to 3.63, dry solids content dropped to 13.8% and reducing sugars content dropped to 2.7%. A strong alcohol fermentation smell was detected with visible production of carbon dioxide (gas bubbles and overpressure in the container).

Example 5

One gallon of LSW having an initial $SO_2$ content of 140 ppm was incubated in a sealed container at 40° C. without any mixing. Initial pH was 4.03, initial dry solids content was 10.6% and initial reducing sugars content was 10.7%. After 20 hours of incubation, the $SO_2$ content dropped to 119 ppm, dry solids content remained substantially the same while pH dropped to 3.82 and reducing sugars dropped to 7.8%. After the next 24 hours of incubation, pH dropped to 3.55, $SO_2$ content dropped to 93 ppm, dry solids content remained the same, and reducing sugars content dropped to 1.7%.

Example 6

One gallon of LSW having an initial $SO_2$ content of 216 ppm was incubated in a sealed container at 40° C. without any mixing. Initial pH was 7.72, initial dry solids content was 7.46% and initial reducing sugars content was 11.6%. After 20 hours of incubation, the $SO_2$ content dropped to 189 ppm while dry solids content, pH, and reducing sugars remained substantially the same. After the next 24 hours of incubation, for a total incubation time of about 44 hours, $SO_2$ content dropped to 170 ppm, pH dropped to 3.69, dry solids content remained the same, and reducing sugars content dropped to 10.4% and was expected to decrease further with additional incubation time.

Example 7

One gallon of LSW having an initial $SO_2$ content of 170 ppm was incubated in a sealed container at 41° C. with short but vigorous mixing after 4 hours and 24 hours of incubation. Initial pH was 3.98, initial dry solids content was 11.2%, and initial reducing sugars content was 12.9%. After 24 hours of incubation, $SO_2$ content dropped to 128 ppm, dry solids content remained the same, pH decreased slightly to 3.91, and reducing sugars content decreased to 10.9%. After next 24 hours of incubation, pH dropped to 3.75, $SO_2$ content dropped to 79 ppm, dry solids content slightly decreased to 11%, and reducing sugars content dropped to 1.3%.

Example 8

One gallon of LSW having an initial $SO_2$ content of 184 ppm was incubated in a sealed container at 41° C. with short but vigorous mixing after 4 hours and after 24 hours of incubation time. Initial pH was 3.95, initial dry solids content was 10.7%, and initial reducing sugars content was 12.0%. After 24 hours of incubation, the $SO_2$ content dropped to 158 ppm, dry solids content decreased to 10.4%, pH decreased slightly to 3.91, and reducing sugars content decreased to 10.7%. After next 24 hours of incubation, pH dropped to 3.79, $SO_2$ content dropped to 89 ppm, dry solids content slightly decreased to 10.0%, and reducing sugars dropped to 1.4%.

Example 9

One gallon of LSW having an initial $SO_2$ content of 56 ppm was incubated at 41° C. with short but vigorous mixing after 24 hours of incubation. After mixing, foaming and slight alcohol odor were noted. Initial pH was 3.95, initial dry solids content was 15.8%, and initial reducing sugars content was 12.1%. After 24 hours of incubation, $SO_2$ content dropped to 30 ppm, dry solids content remained the same, pH slightly decreased to 3.91, and reducing sugars content decreased to 11.6%. After the next 24 hours of incubation, pH dropped to 3.88, $SO_2$ content dropped to 20 ppm, dry solids content decreased to 15%, and reducing sugars dropped to 1.4%.

Example 10

One gallon of LSW having an initial $SO_2$ content of 83 ppm was incubated at 41° C. with short but vigorous mixing after 24 hours and again after 48 hours of incubation. After mixing at 48 hours of incubation, some foam was observed but no alcohol odor was noticed. Initial pH was 4.12, initial dry solids content was 14.6%, and initial reducing sugars content was 12.4%. After 24 hours of incubation, the $SO_2$ content dropped to 43 ppm, dry solids content remained the same, pH decreased slightly to 4.09, and reducing sugars content decreased to 11.1%. After next 24 hours of incubation, pH decreased again to 3.91, $SO_2$ content dropped to 30 ppm, dry solids content decreased to 13.8%, and reducing sugars dropped to 1.6%.

What is claimed is:

1. A process for decreasing the reducing sugars content of light steepwater comprising the steps of drawing off light steepwater having an $SO_2$ content from about 20 ppm to about 220 ppm from a steeping process and incubating the drawn off light steepwater in a complementary incubation for at least about 5 hours.

2. The process of claim 1 wherein the $SO_2$ content is about 50 ppm to about 210 ppm.

3. The process of claim 1 wherein the $SO_2$ content is about 70 ppm to about 140 ppm.

4. The process of claim 1 wherein the light steepwater is incubated during the complementary incubation at a temperature of from about 33° C. to about 48° C.

5. The process of claim 1 wherein the light steepwater is incubated during the complementary incubation for about 5 hours to about 60 hours.

6. The process of claim 1 wherein the light steepwater is incubated during the complementary incubation for about 6 hours to about 48 hours at a temperature of about 37° C. to about 45° C.

7. The process of claim 1 wherein the light steepwater is continuously agitated during the complementary incubation.

8. The process of claim 1 wherein the light steepwater is intermittently agitated during the complementary incubation.

9. The process of claim 8 wherein the light steepwater is agitated for about 1 minute to about 5 minutes about every hour during the complementary incubation.

10. The process of claim 1 wherein the light steepwater is not agitated during the complementary incubation.

11. The process of claim 1 wherein the steeping process comprises a corn steeping battery.

12. The process of claim 11 wherein the steeping battery comprises one or more steeping tanks.

13. The process of claim 11 comprising the additional step of pre-incubating the light steepwater in a steeping tank before the light steepwater is drawn off wherein the light steepwater in the steeping tank has an $SO_2$ content of about 60 ppm to about 100 ppm and the pre-incubation is conducted at a temperature of about 39° C. to about 42° C.

14. The process of claim 1 wherein the light steepwater after the complementary incubation has less than about 6% reducing sugars content.

15. The process of claim 1 wherein the light steepwater after the complementary incubation has less than about 4% reducing sugars content.

16. The process of claim 1 wherein the light steepwater after the complementary incubation has less then about 2% reducing sugars content.

17. The process of claim 1 wherein the light steepwater after the complementary incubation has no reducing sugars content.

18. Light steepwater having less than about 6% reducing sugars content made from the process of claim 1.

19. Light steepwater of claim 18 that is concentrated.

20. A process for decreasing the reducing sugars content of light steepwater comprising the steps of drawing off light steepwater from a corn steeping process having an $SO_2$ content from about 20 ppm to about 220 ppm and incubating the drawn off light steepwater in a complementary incubation at a temperature of about 33° C. to about 48° C. for at least about 5 hours.

21. The process of claim 20 wherein the $SO_2$ content is about 50 ppm to about 210 ppm.

22. A process for decreasing the reducing sugars content of light steepwater comprising the steps adjusting the $SO_2$ content of light steepwater in a steeping process to from about 20 ppm to about 220 ppm by adding fresh acid water having an $SO_2$ content of about 1,200 ppm to about 2,500 ppm into the steeping process, drawing the light steepwater off from the steeping process and incubating the drawn off light steepwater in a complementary incubation for at least about 5 hours.

23. The process of claim 22 wherein the light steepwater is incubated during the complementary incubation at a temperature of from about 33° C. to about 48° C.

24. The process of claim 22 wherein hydrogen peroxide is added to the drawn off light steepwater during the complementary incubation.

25. A process for decreasing the reducing sugars content of light steepwater comprising the steps of drawing off light steepwater from a steeping process, incubating the drawn off light steepwater in a complementary incubation wherein the $SO_2$ content of the drawn off light steepwater is adjusted to from about 20 ppm to about 220 ppm by the addition of hydrogen peroxide to the drawn off light steepwater and the complementary incubation is performed for at least about 5 hours.

26. The process of claim 25 wherein about 1 ppm of hydrogen peroxide is added to the drawn off light steepwater per about 1 ppm of $SO_2$ reduced from the drawn off light steepwater.

27. The process of claim 25 wherein the light steepwater is incubated during the complementary incubation at a temperature of from about 33° C. to about 48° C.

28. A dry product made from the light steepwater of claim 18.

* * * * *